(12) United States Patent
Rock

(10) Patent No.: US 7,449,517 B1
(45) Date of Patent: Nov. 11, 2008

(54) COMPOSITE BUILDING MATERIAL

(75) Inventor: James E. Rock, Norfolk, VA (US)

(73) Assignee: James Rock Associates, LLC, Hampton, VA (US)

( * ) Notice: Subject to any disclaimer, the term of this patent is extended or adjusted under 35 U.S.C. 154(b) by 197 days.

(21) Appl. No.: 10/872,944

(22) Filed: Jun. 21, 2004

Related U.S. Application Data

(60) Provisional application No. 60/480,435, filed on Jun. 21, 2003.

(51) Int. Cl.
*A63J 23/02* (2006.01)

(52) U.S. Cl. .................. 525/35; 264/177.11; 52/309.13

(58) Field of Classification Search .................. 525/35; 264/177.11; 52/309.13
See application file for complete search history.

(56) References Cited

U.S. PATENT DOCUMENTS

| 3,764,642 | A | | 10/1973 | Boutillier |
| 3,841,390 | A | | 10/1974 | DiBennedetto et al. |
| 4,017,245 | A | | 4/1977 | Lang |
| 4,056,344 | A | | 11/1977 | Lemelson |
| 4,128,369 | A | | 12/1978 | Kemerer et al. |
| 4,290,248 | A | | 9/1981 | Kemerer et al. |
| 4,302,409 | A | | 11/1981 | Miller et al. |
| 4,514,327 | A | | 4/1985 | Rock |
| 4,600,461 | A | | 7/1986 | Guy |
| 5,156,890 | A | | 10/1992 | Rock |
| 5,167,781 | A | | 12/1992 | Kemerer et al. |
| 5,224,318 | A | | 7/1993 | Kemerer |
| 5,244,618 | A | | 9/1993 | Kemerer et al. |
| 5,288,772 | A | * | 2/1994 | Hon .............................. 524/35 |
| 5,298,209 | A | | 3/1994 | Pagani et al. |
| 5,330,341 | A | | 7/1994 | Kemerer et al. |
| 5,458,477 | A | | 10/1995 | Kemerer et al. |
| 5,474,722 | A | | 12/1995 | Woodhams |
| 5,505,599 | A | | 4/1996 | Kemerer et al. |
| 5,508,103 | A | | 4/1996 | Cope |
| 5,665,785 | A | | 9/1997 | McClellan et al. |
| 5,700,495 | A | | 12/1997 | Kemerer et al. |
| 5,759,680 | A | * | 6/1998 | Brooks et al. ................ 428/326 |
| 5,863,480 | A | | 1/1999 | Suwanda |
| 5,866,264 | A | * | 2/1999 | Zehner et al. ................ 428/481 |
| 5,919,493 | A | | 7/1999 | Sheppard et al. |
| 6,054,207 | A | | 4/2000 | Finley |
| 6,085,627 | A | | 7/2000 | Denney |
| 6,098,532 | A | | 8/2000 | Sebastian et al. |
| 6,248,813 | B1 | * | 6/2001 | Zehner ......................... 524/13 |

FOREIGN PATENT DOCUMENTS

| EP | 1086988 A1 | * | 3/2001 |
| JP | 61019662 A | * | 1/1986 |

* cited by examiner

*Primary Examiner*—Kelechi C Egwim
(74) *Attorney, Agent, or Firm*—Bowman Green Hampton & Kelly, PLLC

(57) ABSTRACT

An extruded composite building material comprising a thermoplastic resin material, a mixture of additive materials, and a cellulosic material, wherein the thermoplastic resin material, the mixture of additive materials, and the cellulosic material are blended into a composite material, wherein the composite material comprises between 50% to 90% cellulosic material by weight, and wherein the blended composite material is extruded to form the extruded composite building material.

18 Claims, 1 Drawing Sheet

COMPOSITE BUILDING MATERIAL

CROSS-REFERENCE TO RELATED APPLICATIONS

This application claims the benefit of U.S. Provisional Application Ser. No. 60/480,435 filed Jun. 21, 2003, the entire disclosure of which is incorporated herein by reference.

BACKGROUND OF THE INVENTION

1. Field of the Invention

This invention relates generally to extruded composite building materials. In particular, the present invention relates to extruded lightweight composite building materials containing a high percentage of wood particles.

2. Description of Related Art

Because of the need to stop waste materials from going to landfills or being burned, the Wood Plastic Composite (WPC) market has grown. The need has been for WPCs to perform more like wood, but too many of the properties of the plastic are imparted to the WPC, and known WPC's have fallen short of this need.

Generally, known WPC's are not as lightweight, nailable, or paintable as wood and they do not have the machineability of wood.

There are several extruded WPC materials known in the art, it is also known to make lightweight foamed plastic parts. However, WPC materials and parts are typically heavier than real wood and the amount of wood present in the known WPCs is typically only 5% to 40%. Additionally, the density of most WPC materials is greater than 0.8 sq. and many WPC parts have a density of 1.1 to 1.2 sq.

Furthermore, most foamed WPC are comprised of styrene PVC, ABS or ASA.

SUMMARY OF THE INVENTION

This invention is the first product to possess the advantages of wood without certain of the undesirable properties of wood. The potential invention is directed to an extruded, lightweight composite building material that is a replacement for wood. It possesses many of the same characteristics as wood, i.e., it nails and machines like wood, can be flexible or rigid like different types of wood, it will accept oil or latex based paints, stains, varnishes or polyurethane, and can be glued like wood.

Although the composite building material has densities comparable to wood, certain of the characteristics of the composite building material actually surpass those of wood. For example, the composite building material does not absorb water like wood, does not twist or warp like wood, insects will not eat it like wood, and when sanded with the same sandpaper, it finishes better than wood.

In an illustrative, non-limiting embodiment of this invention, the composite building material is formed from between 55% to 90% wood or other natural fiber (i.e., oak, maple, pine, kenaf, cotton stems, straw, wheat, or other grasses), a plastic (as a resin or glue), styrenic rubber, mineral oil, and certain processing aids. The composite building material is extruded to form a building material of a desired dimension and profile.

Accordingly, this invention provides a composite building material, which has a lower density than other WPCs.

This invention separately provides composite building materials, which have densities between 0.5 and 0.8 sq.

This invention separately provides composite building materials, which have densities between 0.4 and 0.8 sq.

This invention separately provides a composite building material, which have improved small cell structures.

This invention separately provides a composite building material, which have improved nailability.

This invention separately provides a composite building material, which requires a reduced lubrication package as compared to other WPCs.

This invention separately provides a composite building material, which exhibits low water absorption.

This invention separately provides a composite building material, which has an improved distribution of plastic coating the wood.

This invention separately provides a composite building material, which has low water absorption with open cells of foamed product.

This invention separately provides a system for producing a composite building material, which provides higher output using existing extruding machines.

This invention separately provides a system for producing a composite building material, which requires a shorter cooling period.

This invention separately provides composite building materials, which may be produced using single pass twin screw machine.

This invention separately provides composite building materials, which are per unit weight and volume as strong or stronger than known WPCs.

This invention separately provides composite building materials, which exhibit better adhesion of paint than known WPCs.

This invention separately provides composite building materials, which are cost effective to produce.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figure.

DETAILED DESCRIPTION OF EXEMPLARY EMBODIMENT(S)

Figure 1:
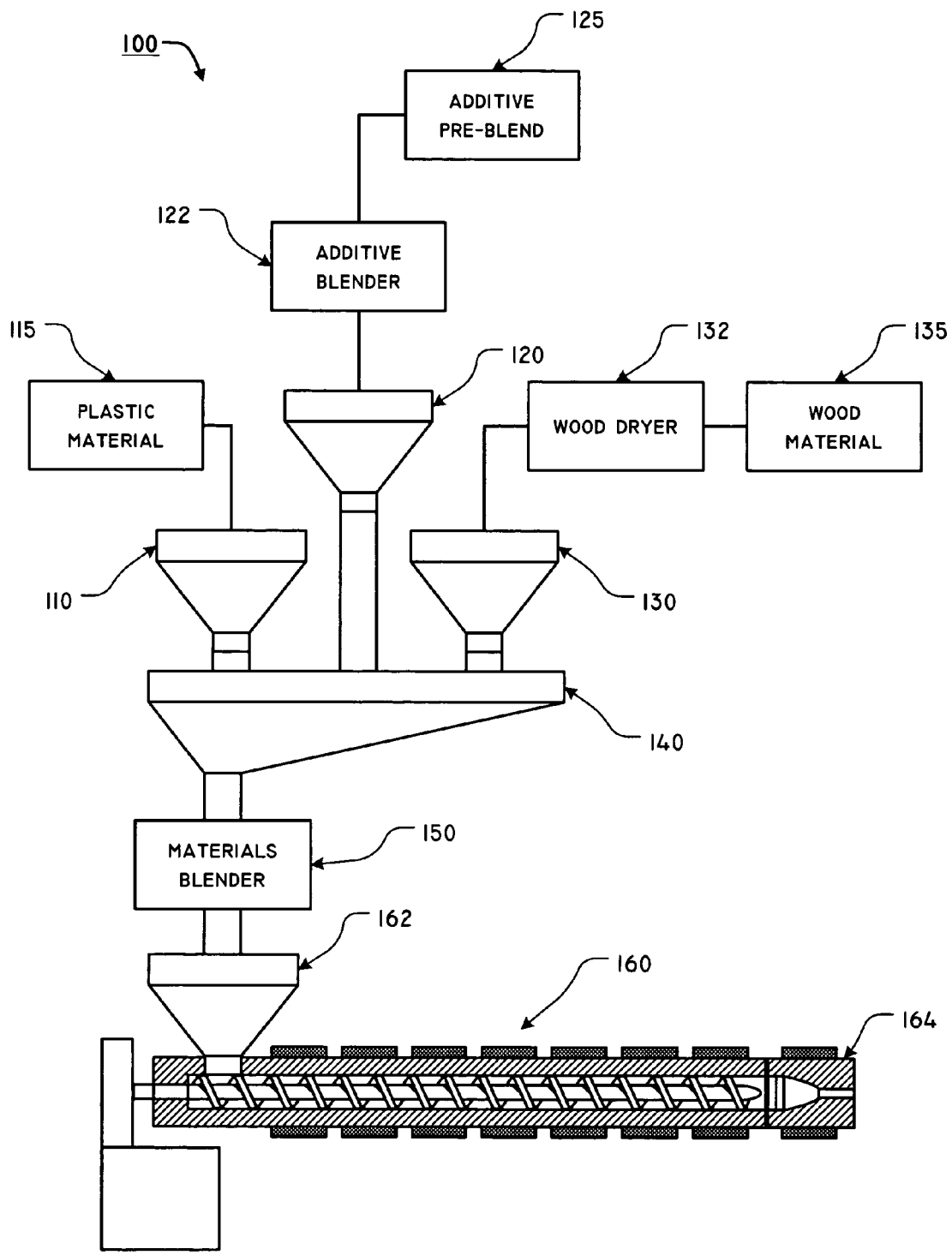
FIG. 1 shows a functional block diagram outlining an exemplary method for producing a composite building material according to this invention.

For simplicity and clarification, the design factors and manufacturing principles of the composite building materials and production systems and methods according to this invention are explained with reference to various exemplary embodiments of the composite building materials and production systems and methods according to this invention. The basic explanation of the design factors and manufacturing principles of the composite building materials and production systems and methods is applicable for the understanding, design, and utilization of the composite building materials and production systems and methods of this invention.

It should be appreciated that, for simplicity and clarification, the term wood or wood material will be used. It should be appreciated that the terms wood and wood material are not to be construed as limiting this invention, but are intended to be illustrative and, therefore, are to be given their broadest meanings. It should be appreciated that the particular wood or wood material used in the composite building materials is a design choice based on the desired appearance, durability, characteristics, and/or functionality of the composite building materials.

It should also be appreciated that, for simplicity and clarification, the term plastic or plastic material will be used. It should be appreciated that the terms plastic and plastic material are not to be construed as limiting this invention, but are intended to be illustrative and, therefore, are to be given their broadest meanings. It should be appreciated that the particular plastic or plastic material used in the composite building materials is a design choice based on the desired appearance, durability, characteristics, and/or functionality of the composite building materials.

FIG. 1 shows a functional block diagram outlining an illustrative, non-limiting embodiment of a system 100 for producing a composite building material according to this invention.

As shown in FIG. 1, the system 100 includes at least some of a plastic material receiver 110, an additive material receiver 120, an additive blender 125, a wood material receiver 130, a wood drier 135, a materials receiver 140, a materials blender 150, and an extruder 160. In various exemplary embodiments, the extruder 160 may be an extruder such as those offered by Extrusion Tech, Milacron, American Maplan, NJF, Krauss-Naffei, NFM Welding, Theysohn, Werner & Pfeiderer, or Entek Extruder. The additive blender 125 and/or the materials blender 150 may be a blender such as those offered by Mcquire or Walton/Stout, Inc. The wood drier 135 may be a drier such as those offered by Scott, Rotary Drum Dryer, Flash Tube, fluid bed, Witte Dryer, Conair, or AEC.

During operation of the system 100, the materials are added to the materials receiver 140. The materials include at least some plastic material 115, additive pre-blend material 125, and wood material 135. In various exemplary embodiments, the plastic material 115 comprises Polypropylene, Polyprophelene, Polyethylene, Polyvinyl Chloride, Acrylonitrile-Styrene-Acrylate Terpolymer, styrene, nylon, a thermoplastic resin, or an equivalent, which will act as a type of resin or "glue" in the composite building material.

The additive pre-blend material 125 may comprise styrenic rubber, mineral oil, a lubricant, a blowing agent, colorants, UV protectants, and other processing aids. Certain of the additive pre-blend materials 125, such as, for example, the styrenic rubber, give the composite building material of this invention greater flexibility and nailability than known WPCs. Other of the possible additive pre-blend materials 125 may include; internal and external lubricants to control the friction between the wood, between the wood and plastic, and aid the materials in moving through the extruder 160 and die section 164; Maleated Polypropylene to add strength to the matrix and to improve water absorption and mechanical properties; mineral oil to plastize the matrix and get better wet out of the plastic to the wood; and blowing agents to blow bubbles into the matrix and to achieve density reduction.

In various exemplary embodiments, before the additive pre-blend material 125 is added to the materials receiver 140, the various components of the additive pre-blend material 125 are blended in the additive blender 122 to ensure the consistency of the additive pre-blend material 125.

The wood material 135 may comprise one or more of oak, maple, pine, kenaf, cotton stems, straw, wheat, or other grasses, natural fiber, or cellulosic materials. The geometry of the individual pieces of the wood material 135 should be in the form of a small chip, such as, for example a wood chip from a saw blade. In various exemplary embodiments, the individual pieces of the wood material 135 have a size of −10 to +80 mesh. In other exemplary embodiments, the individual pieces of the wood material 135 have a size of −10 to +40 mesh. In still other exemplary embodiments, the individual pieces of the wood material 135 have a size of −20 to +40 mesh.

The general shape of the individual pieces of the wood material 135 should be like a chip, not like a fuzzy ball with many small hairs around the edge. When the wood material 135 takes this shape, improved distribution of the plastic is permitted. In this manner, improved strength and reduced water absorption characteristics are provided to the composite building material.

In various exemplary embodiments, before the wood material 135 is added to the materials receiver 140, the wood material 135 is dried in the wood dryer 132. In this manner, at least some of the moisture in the wood material 135, which would be released as steam in the extruder 160, is evaporated or driven from the wood material 135. Thus, unwanted steam is avoided and the wood material 135 is more able to accept the application of the plastic material 115 and certain of the additive pre-blend material 125 during the formation of the composite building material.

In various exemplary embodiments, the wood fiber is dried to approximately 0.1% to 2% water. In other exemplary embodiments, the wood fiber is dried to approximately 0.2 to 0.5% water.

When the appropriate plastic material 115, the blended additive pre-blend material 125, and the dried wood material 135 are available, the materials are added to the materials receiver 140. Care should be taken when the dried wood material 135 is added to the other materials in the materials receiver 140 that the moisture content of the dried wood material 135 is not increased.

In various exemplary embodiments, the composite building material is formed from between 50 to 90% wood material 135 by weight, with the remainder of the composite building material comprising appropriate plastic material 115 and the blended additive pre-blend material 125. In various other exemplary embodiments, the composite building material is formed from between 55 to 90% wood material 135 by weight, with the remainder of the composite building material comprising appropriate plastic material 115 and the blended additive pre-blend material 125. In still other various exemplary embodiments, the composite building material is formed from between 58 to 60% wood material 135 by weight, with the remainder of the composite building material comprising appropriate plastic material 115 and the blended additive pre-blend material 125. The actual percentage of wood material 135 is determined, in large part, by the size and general geometry of the individual pieces of the wood material 135.

When the appropriate plastic material 115, the blended additive pre-blend material 125, and the dried wood material 135 are added to the materials receiver 140, the materials are communicated to the materials blender 150. By blending the materials in the materials blender 150 a uniform mixture of the plastic material 115, the blended additive pre-blend material 125, and the dried wood material 135 may be achieved. In various exemplary embodiments, the materials blender 150 is a blending device, such as, for example, a Colortronic or McGuire blender.

When the plastic material 115, the additive pre-blend material 125, and the wood material 135 are blended to a sufficiently uniform mixture, the blended materials are communicated to the extruder 160, via the blended materials receiver 162. The composite mixture is then further blended and melted in the extruder 160 to form a molten composite. In various exemplary embodiments, the temperature profile of the extruder 160 is maintained so as not to activate the blowing agent in the composite until it passes the vent section of the extruder 160, then the temperature must be raised, sufficient to achieve a desired melt of the composite and to activate the blowing agent. By activating the blowing agent, bubbles are formed in the matrix of the composite to achieve density reduction in the composite building material. In various exemplary embodiments, the exit temperature of the extruder 160 is between 330° F. to 400° F.

When the composite is extruded from the extruder 160, the composite goes through a die section 164, which has a distribution section, a decompression section, a compression section, and a land section. In various exemplary embodiments, the die section 164 is formed so as to have thermal insulators between heating zones. In this manner, the temperature zones of the die section 164 may be heated by electric heaters or heated and cooled with a separate unit using an oil or other heat transfer medium.

In various exemplary embodiments, the extruded composite material exits the land section of the die section 164 having substantially the same size as the cooling sleeve. In other various exemplary embodiments, the extruded composite material exits the land section of the die section 164 having a substantially smaller dimension than the cooling sleeve and then be allowed to expand to a larger dimension in the first section of the cooling sleeve.

From the exit of the land section of the die section 164, the composite material moves through a section of a cooling sizer that is heated to a temperature significantly above the cooling water temperature of the cooling tank. In various exemplary embodiments, this section of the cooling sizer is under a vacuum of 2" $H_g$ to 20" of $H_g$. In various exemplary embodiments, the cooling tank may be one of the cooling tank offered by AEC, Oem, Gatto, Speedex.

Next, the composite material is communicated to a sizer cooled by chilled water to a temperature below 100° F. After exiting the sizer, the extruded composite material is communicated to a saw that cuts it to length. In various exemplary embodiments, the saw may be one of the saws offered by AEC, Oem, Gatto, or Speedex.

Optionally, the extruded composite material may be finished. The finisher may be a wood planer or sander. In various exemplary embodiments, a standard wood is used to emboss a design on the extruded composite material.

A paint or primer may be applied to the composite material using standard painting equipment; i.e., spraying, dipping, brushing, or roll coating. Paints and/or primers achieve a bonding to the composite material of approximately 95 to 98%, which, in many cases, is adequate for paint manufacturers to warranty the paint and/or primer applied to the composite.

While this invention has been described in conjunction with the exemplary embodiments outlined above, it is evident that many alternatives, modifications, and variations will be apparent to those skilled in the art. Such adaptations and modifications should and are intended to be comprehended within the meaning and range of equivalents of the disclosed exemplary embodiments. It is to be understood that the phraseology of terminology employed herein is for the purpose of description and not of limitation. Accordingly, the foregoing description of the exemplary embodiments of the invention, as set forth above, are intended to be illustrative, not limiting. Various changes, modifications, and/or adaptations may be made without departing from the spirit and scope of this invention.

What is claimed is:

1. An extruded composite building material, comprising:
   a thermoplastic resin material;
   a mixture of additive materials;
   a cellulosic material, wherein individual pieces of the cellulosic material are in the form of a chip having a size of −12 to +40 mesh, wherein the cellulosic material is dried, independent of the thermoplastic resin material, to 0.1% to 0.4% moisture by weight, and wherein the level of moisture of the cellulosic material is maintained until the cellulosic material is introduced into an extruder;
   wherein the thermoplastic resin material, the mixture of additive materials, and the cellulosic material are blended immediately prior to introduction into an extruder, to form a composite material, wherein the composite material comprises between 50% to 90% cellulosic material by weight, wherein the blended composite material is extruded to form the extruded composite building material, and wherein the mixture of additive materials comprises a blowing agent, which, when activated, acts to achieve density reduction in the composite building material, such that the composite building material has a density of between 0.4 and 0.8 sq.

2. The composite building material of claim 1, wherein the thermoplastic resin material comprises Polypropylene, Polyprophelene, Polyethylene, Polyvinyl Chloride, Acrylonitrile-Styrene-Acrylate Terpolymer, styrene, nylon, a thermoplastic resin, or an equivalent.

3. The composite building material of claim 1, wherein the mixture of additive materials comprises at least some of styrenic rubber, mineral oil, a lubricant, colorants, UV protectants, and processing aids.

4. The composite building material of claim 1, wherein the mixture of additive materials is pre-blended to improve the consistency of the mixture of additive materials.

5. The composite building material of claim 1, wherein the cellulosic material comprises one or more of oak, maple, pine, kenaf, cotton stems, straw, wheat, grass, or natural fiber.

6. The composite building material of claim 1, wherein the composite material comprises between 58% to 60% cellulosic material by weight.

7. The composite building material of claim 1, wherein individual pieces of the cellulosic material are in the form of a chip having a size of −10 to +40 mesh.

8. The composite building material of claim 1, wherein the cellulosic material is dried to 0.2% to 0.5% by weight.

9. The composite building material of claim 1, wherein the composite building material will accept oil or latex based paints, stains, varnishes, or polyurethane.

10. A composite material, comprising:
    a thermoplastic resin material;
    a mixture of additive materials;
    a cellulosic material, wherein individual pieces of the cellulosic material are in the form of a chip having a size of −12 to +40 mesh, wherein the cellulosic material is dried, independent of the thermoplastic resin material, to 0.1% to 0.4% moisture by weight, and wherein the level of moisture of the cellulosic material is maintained until the cellulosic material is introduced into an extruder;
    wherein the thermoplastic resin material, the mixture of additive materials, and the cellulosic material are blended immediately prior to introduction into an extruder, to form a composite material, wherein the composite material comprises between 50% to 90% cellulosic material by weight, wherein the blended composite material is extruded to form the extruded composite material, and wherein the mixture of additive materials comprises a blowing agent, which, when activated, acts to achieve density reduction in the composite material, such that the composite material has a density of between 0.4 and 0.8 sq.

11. The composite material of claim 10, wherein the thermoplastic resin material comprises Polypropylene, Polyprophelene, Polyethylene, Polyvinyl Chloride, Acrylonitrile-Styrene-Acrylate Terpolymer, styrene, nylon, a thermoplastic resin, or an equivalent.

12. The composite material of claim 10, wherein the mixture of additive materials comprises at least some of styrenic rubber, mineral oil, a lubricant, colorants, UV protectants, and processing aids.

13. The composite material of claim 10, wherein the mixture of additive materials is pre-blended to improve the consistency of the mixture of additive materials.

14. The composite material of claim 10, wherein the cellulosic material comprises one or more of oak, maple, pine, kenaf, cotton stems, straw, wheat, grass, or natural fiber.

15. The composite material of claim 10, wherein the composite material comprises between 58% to 60% cellulosic material by weight.

16. The composite material of claim 10, wherein individual pieces of the cellulosic material are in the form of a chip having a size of −10 to +40 mesh.

17. The composite material of claim 10, wherein the cellulosic material is dried to 0.2% to 0.5% by weight.

18. The composite material of claim 10, wherein the composite material will accept oil or latex based paints, stains, varnishes, or polyurethane.

* * * * *